March 8, 1966  V. MILEWSKI  3,238,600
CLEVIS LOCK CUTTING TOOL HOLDER
Filed Feb. 26, 1964  2 Sheets-Sheet 1
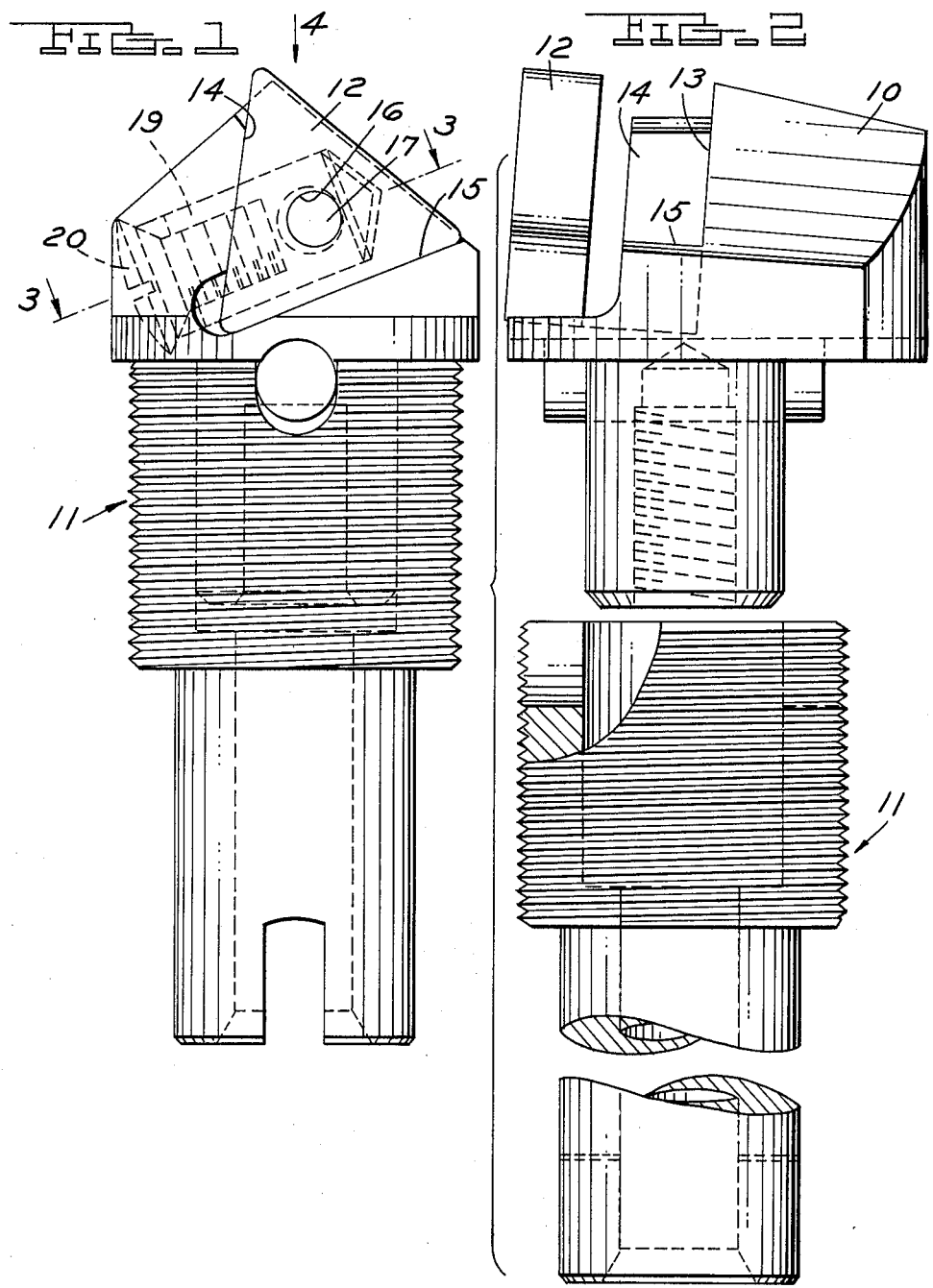
INVENTOR.
VICTOR MILEWSKI
BY Farley, Forster
and Farley
ATTORNEYS March 8, 1966 V. MILEWSKI 3,238,600
CLEVIS LOCK CUTTING TOOL HOLDER
Filed Feb. 26, 1964 2 Sheets-Sheet 2
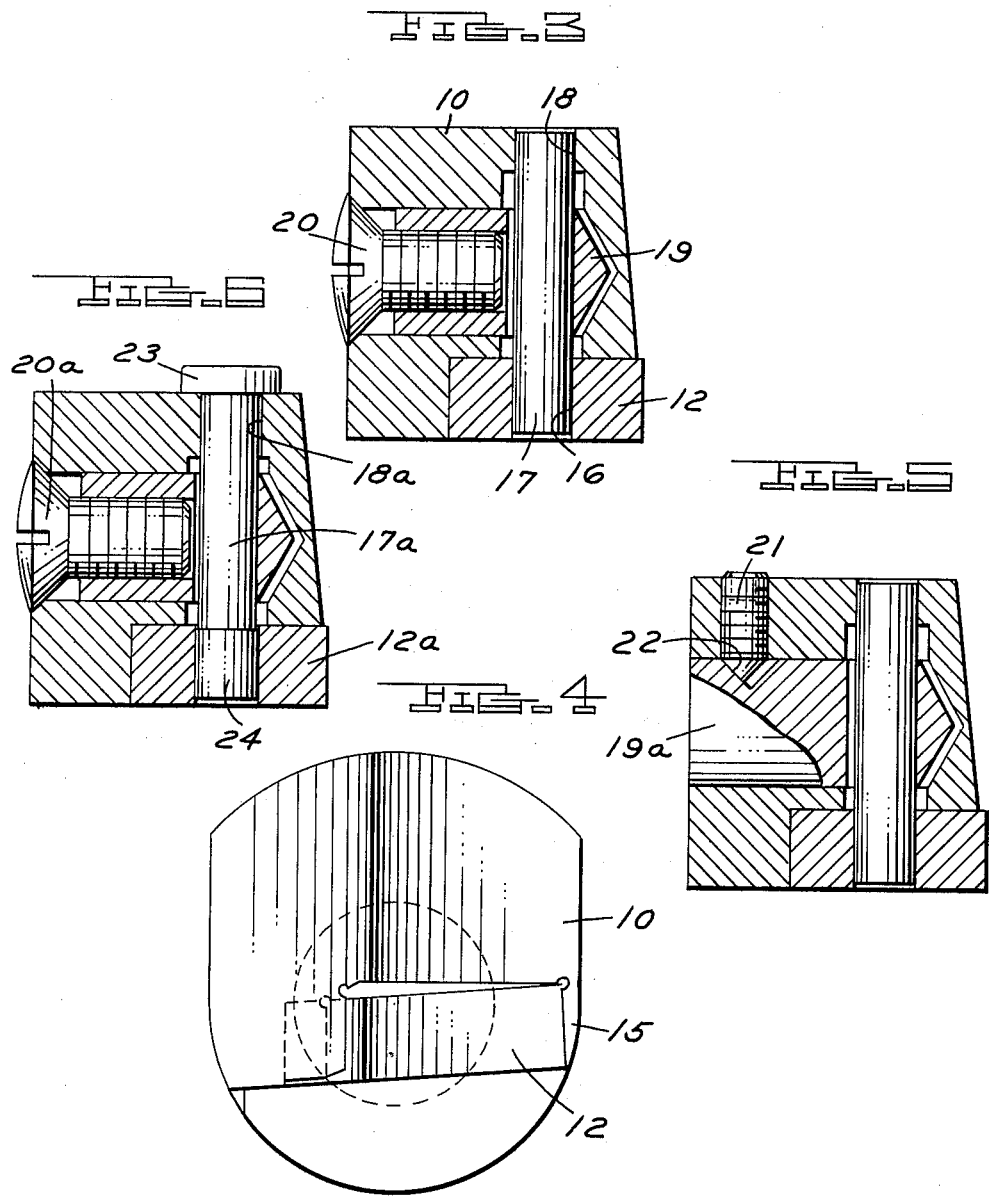
INVENTOR.
VICTOR MILEWSKI
BY Farley, Forster
and Farley
ATTORNEYS

United States Patent Office 3,238,600
Patented Mar. 8, 1966

3,238,600
CLEVIS LOCK CUTTING TOOL HOLDER
Victor Milewski, Birmingham, Mich., assignor to The Valeron Corporation, Detroit, Mich., a corporation of Michigan
Filed Feb. 26, 1964, Ser. No. 347,447
8 Claims. (Cl. 29—96)

This invention relates to an improved construction for holding cutting inserts and more particularly to a construction adapted for holding indexable throwaway cutting inserts made of tungsten, carbide or other suitable materials.

In a typical application of the invention the cutting insert is a relatively thin indexable element having polygonal side faces normal to a main seating face and a central cylindrical hole extending through the insert which is adapted to fit closely over a cylindrical pin extending upwardly from the main seating face, the pin being movable in a radial direction to force one or more side faces of the insert laterally against one or more locating shoulders in the holder, also extending normal to the main seating face.

With this construction no top clamping element is required and any obstructions to the free flow of chips formed by the cutting operation are eliminated. Radial movement of the pin is effected by a screw actuated clevis which engages an intermediate portion of the pin near the cutting insert while the other end of the pin reacts against a cylindrical surface in the holder aligned with the cutting insert hole.

The various objects and advantages of the construction will be apparent from the following description of a preferred embodiment and certain modifications of the invention as illustrated in the drawings wherein:

FIG. 1 is a plan view of a typical triangular cutter insert mounted in an adjustable holder by the present clevis lock pin construction;

FIG. 2 is a side elevation and exploded view of the tool holder shown in FIG. 1;

FIG. 3 is a sectional view of the clevis lock pin construction taken along the line 3—3 of FIG. 1;

FIG. 4 is an end view of the holder only taken along the line 4 of FIG. 1;

FIG. 5 is a view similar to FIG. 3 showing a modified means for actuating the clevis lock; and FIG. 6 is a view similar to FIG. 3 showing a preferred modified pin construction.

Referring to FIGS. 1 and 2 the present clevis lock pin construction is shown as incorporated in the head 10 of a two-piece cartridge insert body 11 (most clearly shown in the exploded view of FIG. 2) for use in an adjustable tool insert such as shown in co-pending application, Serial No. 226,613 filed September 27, 1962. A triangular cutting insert 12 is seated in a pocket in the head 10 having a main seat 13, a shoulder 14 normal thereto and a second shoulder 15 also normal thereto, said shoulders extending substantially to the full height of the cutting insert 12. A central cylindrical hole 16 extending through the cutting insert fits closely but freely over a pin 17 pressed into a cylindrical seat 18 in a wall of the head 10 remote from the cutting insert, such pin also extending through an intermediate clevis 19 which may be actuated by screw 20 to draw the head of the pin 17 and the cutter insert tightly against the shoulder walls 14, 15 of the head 10. When the screw 20 is loosened the cutting insert may be removed and indexed or replaced.

An alternative means for actuating the clevis is shown in FIG. 5 wherein the conical point of a set screw 21 engages one side 22 of a conical recess in a clevis 19a forcing the same into a pin-locking position upon tightening. A preferred construction for the clevis actuated pin lock is illustrated in FIG. 6 wherein the pin 17a is provided with a head 23 and a slightly reduced diameter between such head and the cutting insert engaging end 24. On loosening the screw 20a the pin 17a can be retracted due to a slip-fit relation between the reduced diameter portion of the pin and the cylindrical hole 18a, although the pin will not fall out due to a press-fit relation between the slightly larger end 24 and such hole 18a. The end 24 is preferably limited in length to slightly less than the thickness of the cutting insert 12a so as to avoid pressure at the edge of the hole in the cutting insert which might otherwise cause chipping upon tightening of the pin. It will be understood that retraction of the pin 17a after loosening the screw 20a, facilitates removal and indexing of the cutter insert 12a while reinsertion of the pin may be readily effected upon locating the cutting insert in the pocket prior to moving the pin into engagement.

From the foregoing description and illustrations it will be apparent that the top face of the cutting insert and holder are completely free of any obstructions that might otherwise interfere with the flow of chips formed by the cutting operation.

While a preferred embodiment and several modifications have shown the application of the invention to an adjustable tool insert for boring bars, it will be understood that numerous other modifications and applications to other types of tools, including rotating cutters and turning tools, may be employed without departing from the scope of the invention as defined in the following claims.

I claim:

1. A cutting tool comprising a body having a seat, a cutting insert located on said seat, a hole in said insert having an axis normal to said seat, a hole in said body extending normal to said seat in alignment with said axis, a pin extending into said hole in said body and having one end projecting from said seat into said hole in said insert, at least one shoulder projecting from said seat for locating at least one side surface of said cutting insert, a reaction surface in said body, a reaction portion of said pin inter-fitting in said body against said reaction surface, and actuating means within said body having engagement with said pin spaced from said cutting insert and said reaction portion, said actuating means and body reaction surface exerting a parallel force couple on said pin in a direction substantially normal to said body hole and insert hole axis and in a fixed plane urging the projecting end of said pin and said cutting insert towards said shoulder thereby locking said cutting insert in operating position.

2. A cutting tool as set forth in claim 1 wherein said cutting insert is an indexable polygon having side surfaces normal to said seat, said body having two shoulders for engaging adjacent side surfaces of said insert, and the plane of said parallel force couple extending intermediate the included angle between said two shoulders.

3. A cutting tool as set forth in claim 1 wherein said means for actuating said pin comprises a screw-actuated clevis engaging an intermediate portion of said pin between said cutting insert and said reaction portion of said pin.

4. A cutting tool as set forth in claim 3 wherein the reaction portion of said pin is press fit in said body.

5. A cutting tool as set forth in claim 3 wherein the reaction portion of said pin has a slip fit relation with said body whereby said pin may be retracted to facilitate removal of said cutting insert.

6. A cutting tool as set forth in claim 5 wherein said pin has a head adapted to limit the extent of projection of said cutting insert engaging end above said seat.

7. A cutting tool as set forth in claim 5 wherein the cutting insert engaging end of said pin has a press fit relation with said body limiting the normal retraction thereof.

8. A cutting tool as set forth in claim 6 wherein the cutting insert engaging end of said pin has a press fit relation with said body limiting the normal retraction thereof.

References Cited by the Examiner

UNITED STATES PATENTS 3,154,974  11/1964  Greenleaf _____ 29—96 X
3,173,191  3/1965  Alexander _____ 29—96

FOREIGN PATENTS 71,680  11/1941  Czechoslovakia.

WILLIAM W. DYER, Jr., *Primary Examiner.*

HARRISON HINSON, *Examiner.*